(12) United States Patent
Zalcman et al.

(10) Patent No.: US 9,548,885 B2
(45) Date of Patent: Jan. 17, 2017

(54) SYSTEMS AND METHODS FOR PROVIDING REPLICATED DATA FROM MEMORIES TO PROCESSING CLIENTS

(71) Applicant: Marvell Israel (M.I.S.L) Ltd., Yokneam (IL)

(72) Inventors: Ohad Zalcman, Givaataim (IL); Gil Levy, Hod Hasharon (IL); Galia Peleg, Tel Aviv (IL)

(73) Assignee: MARVELL ISRAEL (M.I.S.L) LTD, Yokneam (IL)

( * ) Notice: Subject to any disclaimer, the term of this patent is extended or adjusted under 35 U.S.C. 154(b) by 758 days.

(21) Appl. No.: 13/932,376

(22) Filed: Jul. 1, 2013

(65) Prior Publication Data

US 2014/0006545 A1    Jan. 2, 2014

Related U.S. Application Data

(60) Provisional application No. 61/667,180, filed on Jul. 2, 2012, provisional application No. 61/717,970, filed on Oct. 24, 2012.

(51) Int. Cl.
*H04L 29/08* (2006.01)
*G06F 13/16* (2006.01)
*H04L 12/861* (2013.01)

(52) U.S. Cl.
CPC ..... *H04L 29/08549* (2013.01); *G06F 13/1657* (2013.01); *H04L 49/90* (2013.01)

(58) Field of Classification Search
CPC ............ H04L 29/08549; H04L 49/90; H04L 49/9005; G06F 13/1657

(Continued)

(56) References Cited

U.S. PATENT DOCUMENTS 5,388,245 A * 2/1995 Wong ................. G06F 13/1642
                                                      711/118
6,141,348 A * 10/2000 Muntz ................ H04Q 11/0478
                                                      370/392

(Continued)

FOREIGN PATENT DOCUMENTS

EP           717 358 A1 *  6/1996
WO   WO 2005033874 A2 *  4/2005 ......... G06F 12/0864

OTHER PUBLICATIONS

International Search Report and Written Opinion dated Jan. 7, 2014 from related/corresponding International PCT Patent Appl. No. PCT/US13/48929 (PCT/IB13/001956).

(Continued)

*Primary Examiner* — Kostas Katsikis

(57) ABSTRACT

Systems and methods are provided for a network device. A device includes a plurality of packet processing clients. The device further includes a plurality of memories, where a quantity of the memories is greater than a quantity of the packet processing clients, each of the memories storing a replica of data, the packet processing clients being configured to selectively read the control data from any of the memories. An arbiter is configured to select in a first clock cycle for the plurality of packet processing clients a first subset of memories from among the plurality of memories from which to read the control data, and in a second clock cycle, subsequent to the first clock cycle, to select for the plurality of packet processing clients a second subset of memories from among the plurality of memories from which to read the control data.

20 Claims, 7 Drawing Sheets

(58) Field of Classification Search
USPC .................................................. 709/213, 214
See application file for complete search history.

(56) References Cited

U.S. PATENT DOCUMENTS

| | | | | |
|---|---|---|---|---|
| 6,240,458 B1* | 5/2001 | Gilbertson | ............... | G06F 13/14 709/232 |
| 6,260,099 B1* | 7/2001 | Gilbertson | ........... | G06F 13/1657 710/112 |
| 6,393,506 B1* | 5/2002 | Kenny | ................ | G06F 13/362 710/107 |
| 6,510,161 B2* | 1/2003 | Trevitt | ................ | H04L 49/103 370/395.7 |
| 6,567,564 B1* | 5/2003 | van der Wal | ............. | G06T 1/20 375/E7.093 |
| 6,912,637 B1* | 6/2005 | Herbst | ................... | H04L 12/46 709/200 |
| 7,143,185 B1* | 11/2006 | Yang | ...................... | H04L 49/00 709/213 |
| 7,281,093 B1 | 10/2007 | Kulkarni et al. | | |
| 8,028,130 B1 | 9/2011 | Weiss et al. | | |
| 8,743,882 B1* | 6/2014 | Kopelman | ............ | H04L 12/462 370/392 |
| 9,100,312 B1* | 8/2015 | Eizenberg | ................ | H04L 47/10 |
| 9,104,531 B1* | 8/2015 | Shumsky | ............... | G06F 13/372 |
| 2003/0065844 A1* | 4/2003 | Lester | ................ | G06F 13/1657 710/107 |
| 2003/0070055 A1* | 4/2003 | Johnson | .............. | G06F 13/1642 711/202 |
| 2004/0146060 A1* | 7/2004 | Deleam | .............. | H04L 49/9094 370/412 |
| 2004/0186945 A1* | 9/2004 | Jeter, Jr. | .............. | G06F 11/2087 711/5 |
| 2005/0135356 A1* | 6/2005 | Muthukrishnan | ... | H04L 12/5693 370/389 |
| 2007/0103979 A1* | 5/2007 | Chen | .................. | G11C 16/3427 365/185.09 |
| 2007/0186027 A1* | 8/2007 | Klema | ................ | G06F 13/4009 710/317 |
| 2007/0271402 A1* | 11/2007 | Subramanian | ........ | G06F 13/364 710/300 |
| 2008/0244231 A1* | 10/2008 | Kunze | .................. | G06F 9/3828 712/207 |
| 2010/0067535 A1* | 3/2010 | Ma | ........................ | H04L 43/028 370/401 |
| 2010/0281131 A1* | 11/2010 | Hesselbarth | ...... | H04L 12/40013 709/213 |
| 2011/0173357 A1* | 7/2011 | Ohmacht | ............ | G06F 13/1657 710/110 |
| 2011/0225337 A1* | 9/2011 | Byrne | ................. | G06F 13/4027 710/306 |
| 2011/0225372 A1* | 9/2011 | Pirog | .................... | G06F 9/3851 711/141 |
| 2011/0225588 A1* | 9/2011 | Pollock | .................... | G06F 9/32 718/102 |
| 2012/0117338 A1* | 5/2012 | Vaidyanath | ......... | G06F 13/1689 711/154 |
| 2012/0275466 A1* | 11/2012 | Bhadra | ............... | H04L 47/2441 370/419 |
| 2013/0290646 A1* | 10/2013 | Greenwood | ............ | H04L 49/90 711/149 |
| 2016/0006677 A1* | 1/2016 | Lamb | .................. | H04L 49/9057 370/412 |

OTHER PUBLICATIONS

Office Action mailed Sep. 20, 2016 in related/corresponding Chinese Patent Appl. No. 201380035085.0, filed Dec. 30, 2013.

* cited by examiner

Client Mapping Per Memory

| | Clock Cycle 0 | Clock Cycle 1 | Clock Cycle 2 | Clock Cycle 3 | Clock Cycle 4 | Clock Cycle 5 |
|---|---|---|---|---|---|---|
| Memory 0 | 0 | 0 | Free | 1 | Free | 2 |
| Memory 1 | 1 | Free | 2 | 2 | Free | 0 |
| Memory 2 | 2 | Free | 0 | Free | 1 | 1 |
| Memory 3 | Free | 1 | 1 | Free | 2 | Free |
| Memory 4 | Free | 2 | Free | 0 | 0 | Free |

*Fig. 3*

Client Mapping Per Memory — 502

Memory Mapping Per Client — 504

| | Memory 0 | Memory 1 | Memory 2 | Memory 3 | Memory 4 | Client 0 | Client 1 | Client 2 |
|---|---|---|---|---|---|---|---|---|
| Cycle 0 | 0 | 1 | 2 | Free | Free | 0 | 1 | 2 |
| Cycle 1 | 0 | Free | Free | 1 | 2 | 0 | 3 | 4 |
| Cycle 2 | Free | 2 | 0 | 1 | Free | 2 | 3 | 1 |
| Cycle 3 | 1 | 2 | Free | Free | 0 | 4 | 0 | 1 |
| Cycle 4 | Free | Free | 1 | 2 | 0 | 4 | 2 | 3 |
| Cycle 5 | 2 | 0 | 1 | Free | Free | 1 | 2 | 0 |

506 points to "2" in Memory 4 at Cycle 1. 508 points to "4" in Client 2 at Cycle 1.

*Fig. 5*

SYSTEMS AND METHODS FOR PROVIDING REPLICATED DATA FROM MEMORIES TO PROCESSING CLIENTS

CROSS-REFERENCE TO RELATED APPLICATIONS

This application claims priority to U.S. Provisional Patent Application No. 61/667,180, filed Jul. 2, 2012, entitled "Scalable N to M Arbiter," and U.S. Provisional Patent Application No. 61/717,970, filed Oct. 24, 2012, entitled "Scalable N to M Arbiter," which are herein incorporated in their entirety.

FIELD

The technology described herein relates generally to multi-device access to a shared resource and more particularly to multi-device memory access M a network communication system.

BACKGROUND

Multi-device access to a shared resource often results in access bandwidth complications that in certain configurations slow an entire system. This is especially the case in high speed communication systems, such as a network switch, where multiple packet processing clients seek to access control data stored in a memory.

The description above is presented as a general overview of related art in this field and should not be construed as an admission that any of the information it contains constitutes prior art against the present patent application.

SUMMARY

Examples of systems and methods are provided for a network device that receives packet data from a network. A device includes a plurality of packet processing clients for processing packet data received from a network. The device further includes a plurality of memories, where a quantity of the memories is greater than a quantity of the packet processing clients, each of the memories storing a replica of control data to be used by the packet processing clients, and the packet processing clients being configured to selectively read the control data from any of the memories. An arbiter is coupled to the packet processing clients and to the memories, the arbiter being configured to select in a first clock cycle for the plurality of packet processing clients a first subset of memories from among the plurality of memories from which to read the control data, and in a second clock cycle, subsequent to the first clock cycle, to select for the plurality of packet processing clients a second subset of memories from among the plurality of memories from which to read the control data, the second subset of memories including at least some memories that are not included in the first subset of memories.

As another example, a method of providing control data to a plurality of packet processing clients configured to process packet data received by a network includes updating a plurality of M memories with replicated control data to be used by a plurality of N packet processing clients, where M is greater than N. One of the memories from among the M memories is assigned to each of the packet processing clients for accessing the control data during a first clock cycle, each packet processing client being assigned a different one of the memories from among the M memories, and where at least one of the memories among the M memories is a first unassigned memory that is not assigned to a packet processing client during the first clock cycle. A different memory from among the M memories is assigning to each of the processing clients for accessing the control data during a second clock cycle, where at least one of the memories among the M memories is a second unassigned memory that is not assigned to a packet processing client during the second clock cycle, the second unassigned memory being different from the first unassigned memory.

BRIEF DESCRIPTION OF THE DRAWINGS

FIG. 3 is a chart depicting the memory-processing client assignments for clock cycles 0-2 as well as clock cycles 3-5.

FIG. 5 is a chart depicting the memory-processing client assignments for clock cycles 0-2 as well as clock cycles 3-5 using the algorithms described with respect to FIGS. 2 and 4.

DETAILED DESCRIPTION

Figure 1:
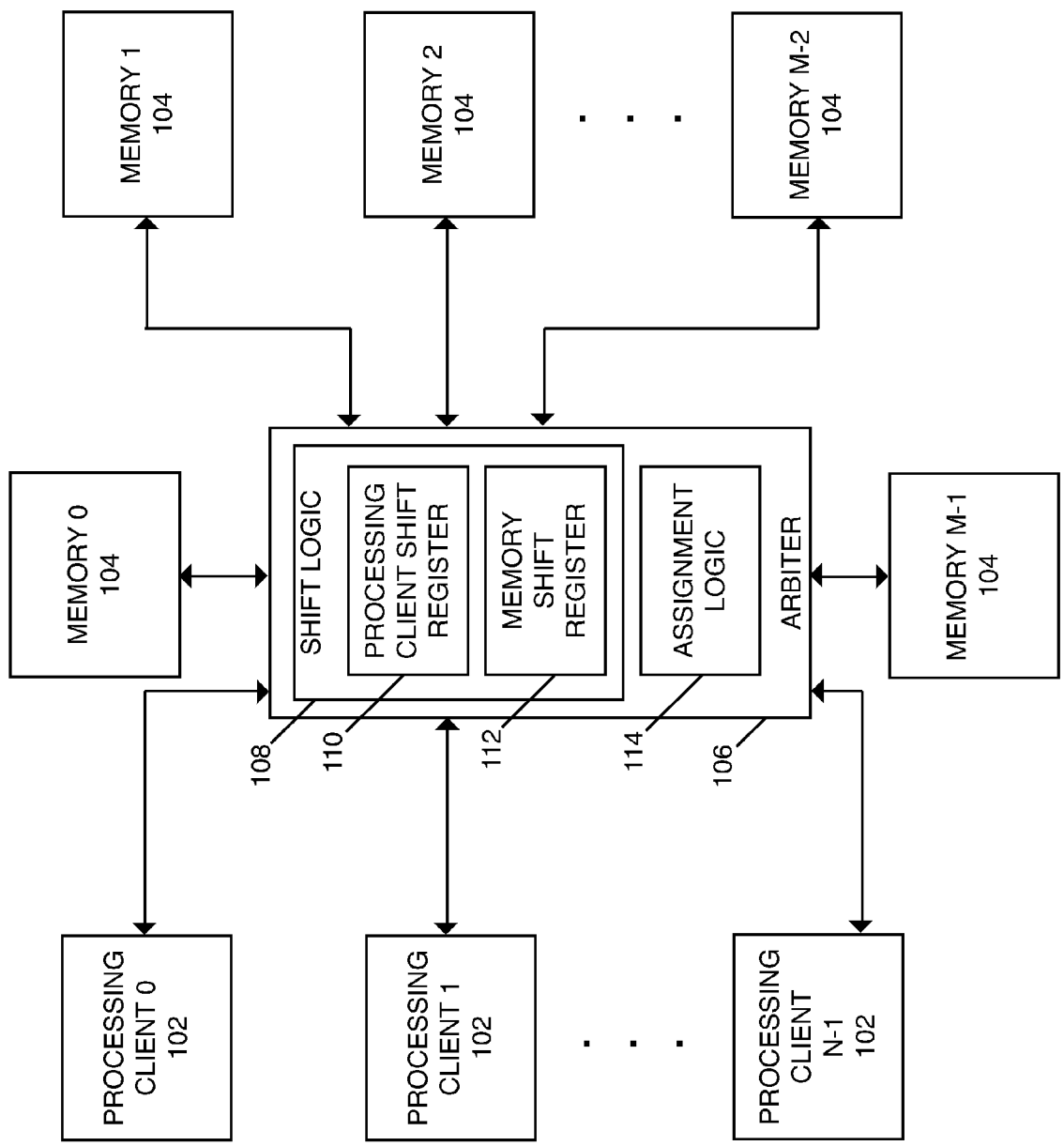
FIG. 1 is a block diagram depicting a network device that receives packet data from a network.

FIG. 1 is a block diagram depicting a network device that receives packet data from a network. The network device includes a plurality of N packet processing clients 102 for processing packet data received from a network. The device also includes a plurality of M memories 104. The quantity of memories (M) 104 is greater than a quantity of packet processing clients (N) 102. For example, in one embodiment of the disclosure, M=5 memories provide data to N=3 processing clients. Each of the memories 104 stores a replica of control data to be used by the packet processing clients 102. The packet processing clients 102 are configured to read the control data from any of the memories 104. The device further includes an arbiter 106 that is coupled to the packet processing clients 102 and to the memories 104. In an embodiment, the arbiter 106 is configured to select in a first clock cycle for the plurality of packet processing clients 102 a first subset of memories, subset A for example, from among the plurality of memories 104 from which to read the control data. The arbiter 106 is further configured to select, in a second clock cycle, for the plurality of packet processing clients 102 a second subset of memories, subset B for example, from among the plurality of memories 104 from which to read the control data. The second subset of memories includes at least some of the memories that are not included in the first subset of memories. Further, the arbiter 106 is configured to select the subsets of memories such that the second subset of memories does not include at least one memory that is in the first subset of memories. It is noted that in actual devices, there may be a greater or lesser number of processing clients 102 as well as a greater or lesser number of memories 106. Moreover, as will be described in greater detail below, in actual devices there may be a different variance among selected subsets between respective cycles than seen in FIG. 1.

In one embodiment of the disclosure, the arbiter 106 is configured to assign memories 104 to packet processing clients 102 in a pseudo random fashion as a mechanism for load balancing and ensuring fairness in access to the memories 104, for example. Because, in some embodiments, a packet processing client takes more than one clock cycle to perform a read operation on a particular memory, such as accessing a lookup data table stored on the particular memory, or because the particular memory is unable to perform certain types of accesses in a back-to-pack fashion (e.g., certain DDR3 protocols do not support reading data from the same page on consecutive cycles), a packet processing client that is assigned the particular memory in the next clock cycle is not able to perform its read operation due to that particular memory being busy or unable to perform. A particular packet processing client that is always assigned a memory immediately after that memory has been assigned to another busy packet processing client would regularly be blocked from performing read operations, slowing total processing of the particular packet processing client. In contrast, a particular packet processing clients that is assigned a memory after that memory was unassigned for a previous clock cycle is much more likely to be able to perform its desired read operations because that previously unassigned memory has had more than one clock cycle to complete any previous requests in its job queue that were not yet completed. For example, in one embodiment of the disclosure where a network device operates in a system that is oversubscribed, the bandwidth of the M memories is not sufficient to serve all client requests. In such an embodiment, a network device attempts to provide each processing client the same portion of memory accesses, such as using certain algorithms described herein.

To combat such unfairness, in one embodiment, a network device performs operations to assign memories to packet processing clients in a pseudo random fashion that ensures that because certain memories are not assigned to a packet processing client during each clock cycle, during a set of processing cycles, each of the packet processing clients is assigned a memory that was not assigned to another packet processing client during a previous clock cycle at least once. Having more copies of control data than processors, and rotating access to the memories containing those control data copies, a network device, in one embodiment, supports increased bandwidth by reducing blockage resulting from reading data at a given memory on two consecutive cycles.

FIG. 1 discloses additional network device elements that, in one embodiment of the disclosure, are used to facilitate this pseudo random memory assignment in accordance with an embodiment. In FIG. 1, the arbiter 106 includes shift logic 108 in the form of one or both of a first shift register 110 that operates as a processing client shift register and a second shift register 112 that operates as a memory shift register 112. These shift registers include an array of entries that are shifted X positions (e.g., one or more positions) left or right each clock period in a wrap around fashion. Example functionality of the processing client shift register 110 is described in further detail with respect to FIG. 2, and example functionality of the memory shift register 112 is described with respect to FIG. 4. The arbiter 106 further includes assignment logic 114 that matches packet processing clients with memories.

Figure 2:
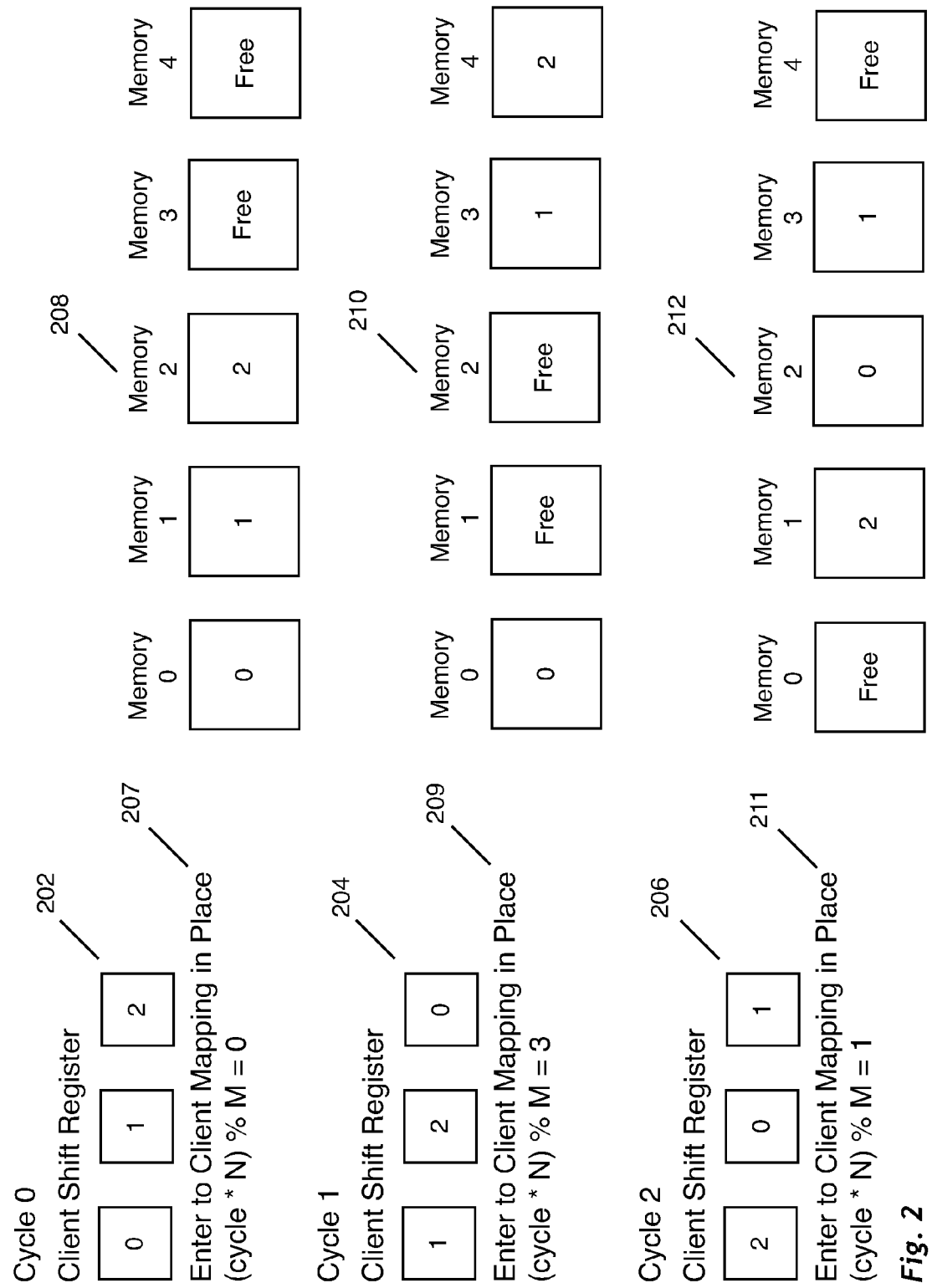
FIG. 2 depicts an example assignment of memories to processing clients for access to data that is replicated at each of the memories.

FIG. 2 depicts an example assignment mechanism for assigning memories to processing clients for access to data that is replicated at each of the memories. The example of FIG. 2 includes N=3 processing clients and M=5 memories. Thus, in each clock cycle, two memories will not be assigned to a processing client, while three of the memories will be assigned to a processing client. A processing client shift register is depicted at 202. The client shift register 202 includes an entry for each of the processing clients, which are numbered sequentially 0, 1, 2. The client shift register 202 identifies an order in which the packet processing clients are assigned memories for a particular clock cycle. In the example of FIG. 2, for cycle 0, the processing clients are assigned memories such that Processing Client 0 is assigned a memory first, Processing Client 1 is assigned a memory second, and Processing Client 2 is assigned a memory third. For cycle 1, the client shift register is shifted one position left, as indicated at 204, such that Processing Client 1 is assigned a memory first, Processing Client 2 is assigned a memory second, and Processing Client 0 is assigned a memory third. For cycle 2, the client shift register is shifted another position left, as indicated at 206, such that Processing Client 2 is assigned a memory first, Processing Client 0 is assigned a memory second, and Processing Client 1 is assigned a memory third. Such memory to processing client assignments are performed sufficiently quickly, in an embodiment, such that each of the processing clients are able to perform read operations in each cycle, barring an assigned memory being busy or otherwise unable to perform.

In addition to varying the order in which the processing clients are assigned memories, memories are assigned in a numeric order where the memory assignment starting point is also varied based on assignment logic. This assignment logic for each of cycles 0, 1, and 2 is indicated in FIG. 2 at 207, 209, 211, respectively. In the example of FIG. 2, the first memory to be assigned to a processing client is determined according to the formula:

$$\text{Starting Memory}=(\text{cycle}*N)\%\ M, \qquad (\text{eq. 1})$$

where cycle is a clock cycle number, N is the number of packet processing clients, % represents a modulo operation, and M is the number of memories. Thus, for clock cycle 0, Memory 0 is the first memory to be assigned (i.e., Starting Memory=(0*3)% 5=0). Memory 0 is assigned to the first processing client according to the order shown in the client shift register at 202, Processing Client 0, as depicted at 208. Memory 1 is the next memory to be assigned and is assigned to the second memory in the client shift register 202 order, Processing Client 1. Further, Memory 2 is the third memory to be assigned, and Memory 2 is assigned to the third memory in the client shift register 202 order, Processing Client 2. As indicated at 208, Memory 3 and Memory 4 are not assigned a processing client for clock cycle 0 because each of Processing Clients 0, 1, 2 have already been assigned memories.

For clock cycle 1, the client shift register is shifted one position to the left, as indicated at 204, and the assignment logic determines that Memory 3 is the first memory to be assigned to a processing client Starting Memory=(1*3)% 5=3). Thus, for clock cycle 1, Memory 3 is assigned to the first processing client according to the order shown in the client shift register at 204, Processing Client 1, as depicted at 210. Memory 4 is the next memory to be assigned and is assigned to the second memory in the client shift register 204 order, Processing Client 2. Memories are assigned in a wraparound fashion. Thus, Memory 0 is the third memory to be assigned, and Memory 0 is assigned to the third memory in the client shift register 204 order, Processing Client 0. As indicated at 210, Memory 1 and Memory 2 are not assigned a processing client for clock cycle 1.

For clock cycle 2, the client shift register is shifted one position to the left, as indicated at 206, and the lent determines that Memory 1 is the first memory to be assigned to a processing client (i.e., Starting Memory=(2*3)% 5=1). Thus, for clock cycle 2, Memory 1 is assigned to the first processing client according to the order shown in the client shift register at 206, Processing Client 2, as depicted at 212. Because, in one embodiment of the disclosure, memories are assigned in a sequential order, Memory 2 is the next memory to be assigned and is assigned to the second memory in the client shift register 206 order, Processing Client 0. Further, Memory 3 is the third memory to be assigned, and Memory 3 is assigned to the third memory in the client shift register 206 order, Processing Client 1. As indicated at 212, Memory 0 and Memory 4 are not assigned a processing client for clock cycle 2.

FIG. 3 is a mapping of the memory-processing client assignments for clock cycles 0-2 as well as clock cycles 3-5, in accordance with an embodiment. Clock cycle 0-2 assignments were determined using the process depicted in FIG. 2, while cycle 3-5 assignments were determined via continued iterations of that same algorithm. As described above, a processing client is more likely to be able to perform a desired read operation when the memory assigned to that processing unit was free in one or more immediately preceding clock cycles. Over the six cycles depicted, each of Processing Clients 0, 1, 2 is assigned a memory that was free in an immediately preceding clock cycle at least three times. Thus, in one embodiment of the disclosure, a network device attempts to serve high quality memory allocation slots evenly across the set of processing clients over time.

Figure 4:
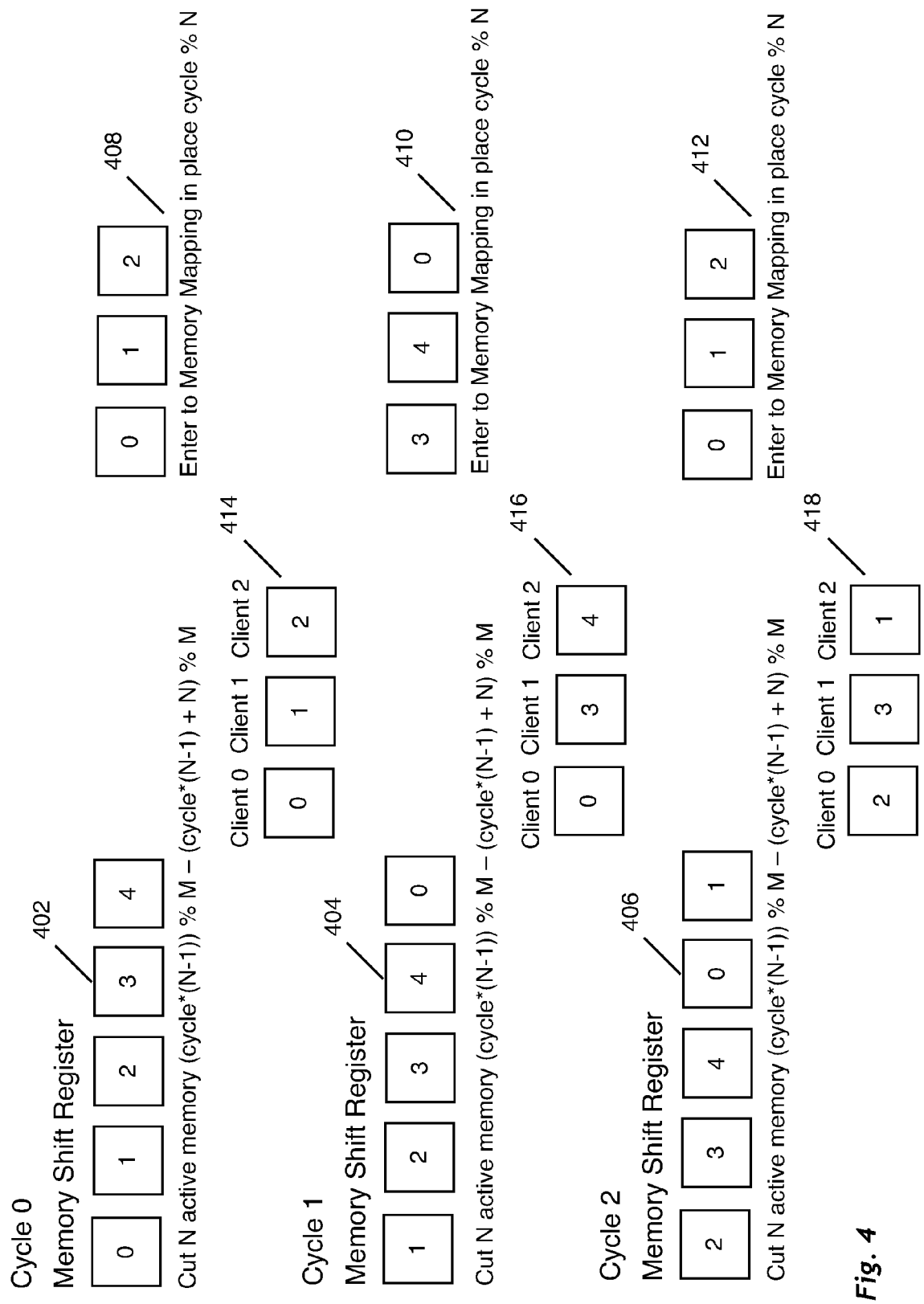
FIG. 4 depicts another example algorithm for assignment of memories to processing clients for access to data that is replicated at each of the memories.

FIG. 4 depicts another example algorithm for assignment of memories to processing clients for access to data that is replicated at each of the memories, in accordance with an alternative embodiment of the disclosure. The algorithm of FIG. 4 produces an identical assignment result as the algorithm of FIG. 2 while using a memory shift register in place of a client shift register and a variant of the assignment logic used in FIG. 2. The algorithm of FIG. 2 identifies which processing clients are served (or free) by each of the memories during each clock cycle. Such a mapping is useful for connecting memories to the correct processing clients when returning results via the arbiter. The algorithm of FIG. 4 identifies which memory is serving each of the processing clients. Such a mapping is useful for sending processing client requests to the proper memories via the arbiter. Thus, in embodiments of the disclosure, an arbiter performs one or both of the algorithms in FIG. 2 and FIG. 4 to aid in transmitting read requests and returning read request results. In other embodiments, an arbiter performs one of the FIG. 2 and FIG. 4 algorithms and translates to the other assignment representation, as described in further detail with reference to FIG. 5.

In the embodiment of FIG. 4 a memory shift register 402 includes an entry for each of the memories, which are numbered sequentially 0, 1, 2, 3, 4. The memory register 402 identifies an order in which the memories are assigned to processing clients for a particular clock cycle. In the example of FIG. 4, during cycle 0, the processing clients are assigned memories such that Memory 0 is assigned to a processing client first, Memory 1 is assigned to a processing client second, Memory 2 is assigned to a processing client third, Memory 3 is assigned to a processing client fourth, and Memory 4 is assigned to a processing client fifth, as depicted at 402. At 404, for cycle 1, the memory shift register is shifted one position left such that Memory 1 is assigned to a processing client first, Memory 2 is assigned to a processing client second, Memory 3 is assigned to a processing client third, Memory 4 is assigned to a processing client fourth, and Memory 0 is assigned to a processing client fifth. At 406, for cycle 2, the memory shift register is shifted one position left such that Memory 2 is assigned to a processing client first, Memory 3 is assigned to a processing client second, Memory 4 is assigned to a processing client third, Memory 0 is assigned to a processing client fourth, and Memory 1 is assigned to a processing client fifth.

Because there are fewer processing clients than memories, in each cycle, the assignment logic determines which of the memories will not be assigned to a processing client. In each cycle, M-N memories are cut from the subset of memories that are selected for assignment, leaving N memories in the subset of memories for assignment to N processing clients. In the example of FIG. 4, two memories are cut, because M=5 and N=3. The assignment logic begins cutting memories from the subset of memories to be assigned at the memory identified by the formula:

$$\text{Starting Memory}=(\text{cycle}*(N-1))\% \ M-(\text{cycle}*(N-1)+N)\% \ M, \quad \text{(eq. 2)}$$

where cycle is a clock cycle number, N is the number of packet processing clients, % represents a modulo operation, and M is the number of memories. Thus for cycle 0, memories are cut starting at position 3 of the memory shift register, resulting in Memory 3 and Memory 4 being cut, leaving Memory 0, Memory 1, and Memory 2 for assignment, as indicated at 408 (i.e., Starting Memory=(0*(3−1))% 5−(0*(3−1)+3)% 5=3). For cycle 1, memories are cut starting at position 0 of the memory shift register, resulting in Memory 1 and Memory 2 being cut, leaving Memory 3, Memory 4, and Memory 0 for assignment, as indicated at 410. For cycle 2, memories are cut starting at position 3 of the memory shift register, resulting in Memory 4 and Memory 0 being cut, leaving Memory 1, Memory 2, and Memory 3 for assignment, as indicated at 412.

In an embodiment, the remaining memories (e.g., the memories at 408) are then assigned to processing clients starting at the processing client identified by:

$$\text{Starting Client}=\text{cycle} \% \ N, \quad \text{(eq. 3)}$$

where cycle is a clock cycle number, % represents a modulo operation, and N is the number of packet processing clients. Thus, for cycle 0, Processor Client 0 is assigned the first memory remaining at 408, Memory 0; Client 1 is assigned the second memory at 408, Memory 1; and Client 2 is assigned the third memory at 408, Memory 2, as depicted at 414. For cycle 1, Processor Client 1 is assigned the first memory remaining at 408, Memory 3; Client 2 is assigned the second memory at 408, Memory 4; and Client 0 is assigned the third memory at 408, Memory 0, as depicted at 416. For cycle 2, Processor Client 2 is assigned the first memory remaining at 408, Memory 1; Client 0 is assigned the second memory at 408, Memory 2; and Client 1 is assigned the third memory at 408, Memory 3, as depicted at 418.

FIG. 5 is a chart depicting the memory-processing client assignments for clock cycles 0-2 as well as clock cycles 3-5 using the algorithms described with respect to FIGS. 2 and 4, in an embodiment. At 502, FIG. 5 depicts a client napping per memory, illustrating the memory assignments according to the algorithm of FIG. 2, while at 504, FIG. 5 depicts a memory mapping per client, illustrating the memory assignments according to the algorithm of FIG. 4, in an embodiment. These mappings are analogous. For example, for cycle 2, Memory 1 is mapped to Processing Client 2, Memory 2 is mapped to Processing Client 0, and Memory 3 is mapped to Processing Client 1 for both of the FIG. 2 and FIG. 4 algorithm determined mappings. Thus, in different embodiments of the disclosure, different algorithms are utilized, and variations of algorithms are used toward a common result of implementing a pseudo random assignment of memories to processing clients that results in fair load balancing among the memories.

Additionally, results produced using one of the FIG. 2, FIG. 4 algorithms can be translated to the other. For example, where for clock cycle 1 using the FIG. 2 algorithm, Memory 0 is assigned to Processing Unit 0, Memory 3 is assigned to Processing Unit 1, and Memory 4 is assigned to Processing Unit 2, as indicated at 506, the memory mapping per client equivalent, which can be determined using the FIG. 4 algorithm, can also be determined by identifying which memory is assigned to Processing Client 0 (Memory 0), which memory is assigned to Processing Client 1 (Memory 3), and which memory is assigned to Processing Client 2 (Memory 4), as indicated at 508. Additionally, to translate from the FIG. 4 memory mapping client of the FIG. 4 algorithm at 508 to the FIG. 4 representation, an arbiter iterates through each of the Memories 0-5, identifying which have been assigned to which processing client, where some memories are not assigned and are thus marked free in the representation at 506.

The pseudo random nature of the arbiter assignment enables predictability that is important in some embodiments of the disclosure. For example, in certain embodiments where memory response time varies significantly across the population of memories, it is important that a processing client possess data identifying from which memory to expect data for a particular clock cycle. When memories take more than one clock cycle to provide control data results, and a processing client makes memory requests over consecutive clock cycles, the processing client needs to possess data identifying from Which Memory to expect data for given clock cycle's request, enabling the processing client to match returned data with the proper read request. By implementing the arbiter algorithm at the processing client, alone or in parallel with an arbiter, the processing clients still function reliably, even with significant variances in memory response times. For example, in an embodiment where Processing Client 1 requests data from a first position in the replicated lookup table in Memory 1 at clock cycle 1 and further requests data from a second position in the replicated lookup table in Memory 2 at clock cycle 2, when Memory 2 returns its data before Memory 1, Processing Client utilizes its per-clock cycle memory assignment data to match the data from Memory 1 with the first request and the data from Memory 2 with the second request, despite receiving those responses out of order.

Figure 6:
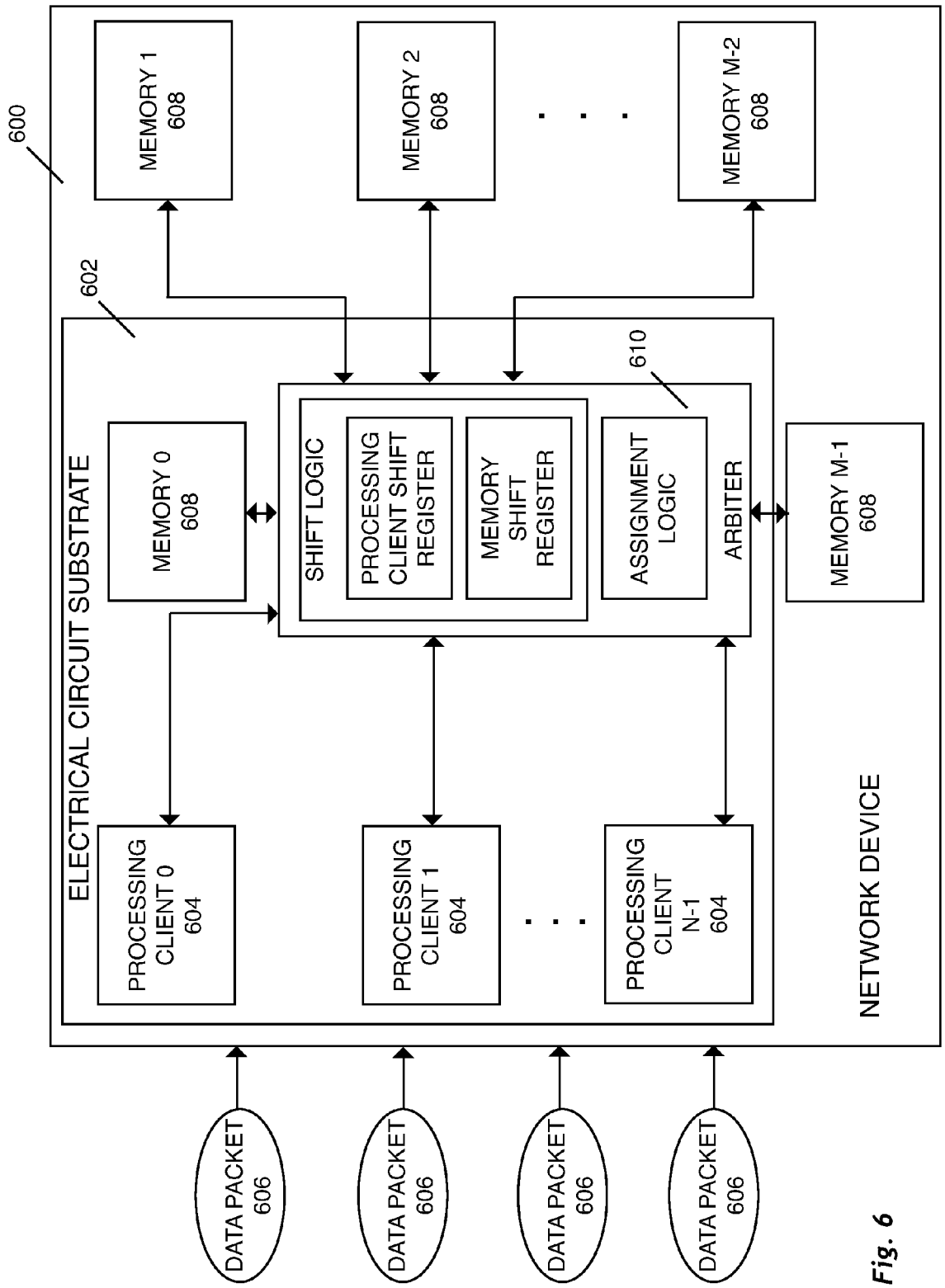
FIG. 6 is a block diagram depicting a network device.

FIG. 6 is a block diagram depicting a network device. The network device 600 includes a first electrical substrate 602 and a plurality of packet processing clients 604 for processing packet data 606 received from a network disposed on the first electrical substrate 602. The network device 600 further includes a plurality of memories 608 that are external to the electrical circuit substrate 602, for example external memories implemented using double data rate 3 (DDR3) technologies. In other embodiments of the disclosure, greater or lesser number of memories are implemented, and in still other embodiments of the disclosure, the memories are implemented in SRAM or on the electrical circuit substrate 602 itself. The quantity of the memories 608 is greater than the quantity of the packet processing clients 604 in an embodiment. Each of the memories 608 stores a replica of control data to be used by the packet processing clients 604. The packet processing clients 604 are configured to read the control data from any of the memories 608. The network device 600 further includes an arbiter 610 disposed on the first electrical substrate 602 that is coupled to the packet processing clients 604 and to the memories 608. The arbiter 610 is configured to select in a first clock cycle for the plurality of packet processing clients 604 a first subset of memories, subset A for example, from among the plurality of memories 608 front which to read the control data, and in a second clock cycle to select for the plurality of packet processing clients 604 a second subset, subset B for example, of memories from among the plurality of memories 608 from which to read the control data, where the second subset of memories includes at least some memories that are not included in the first subset of memories.

In one embodiment of the disclosure, each of the memories includes a replica of control data that is used to process packets in a network device. This replicated data is used by the respective packet processing clients. For example, in one embodiment where the packet processing clients are components of a LAN switch, the replicated data includes a switch lookup table. Upon receiving a packet, a processing client reads the MAC address that is in the frame header of a received packet. The processing client accesses one of the replicated switch lookup tables on one of the memories to determine an appropriate output port for the received packet. Upon accessing the port data for the received packet, the processing client forwards the received packet on the appropriate output port.

Figure 7:
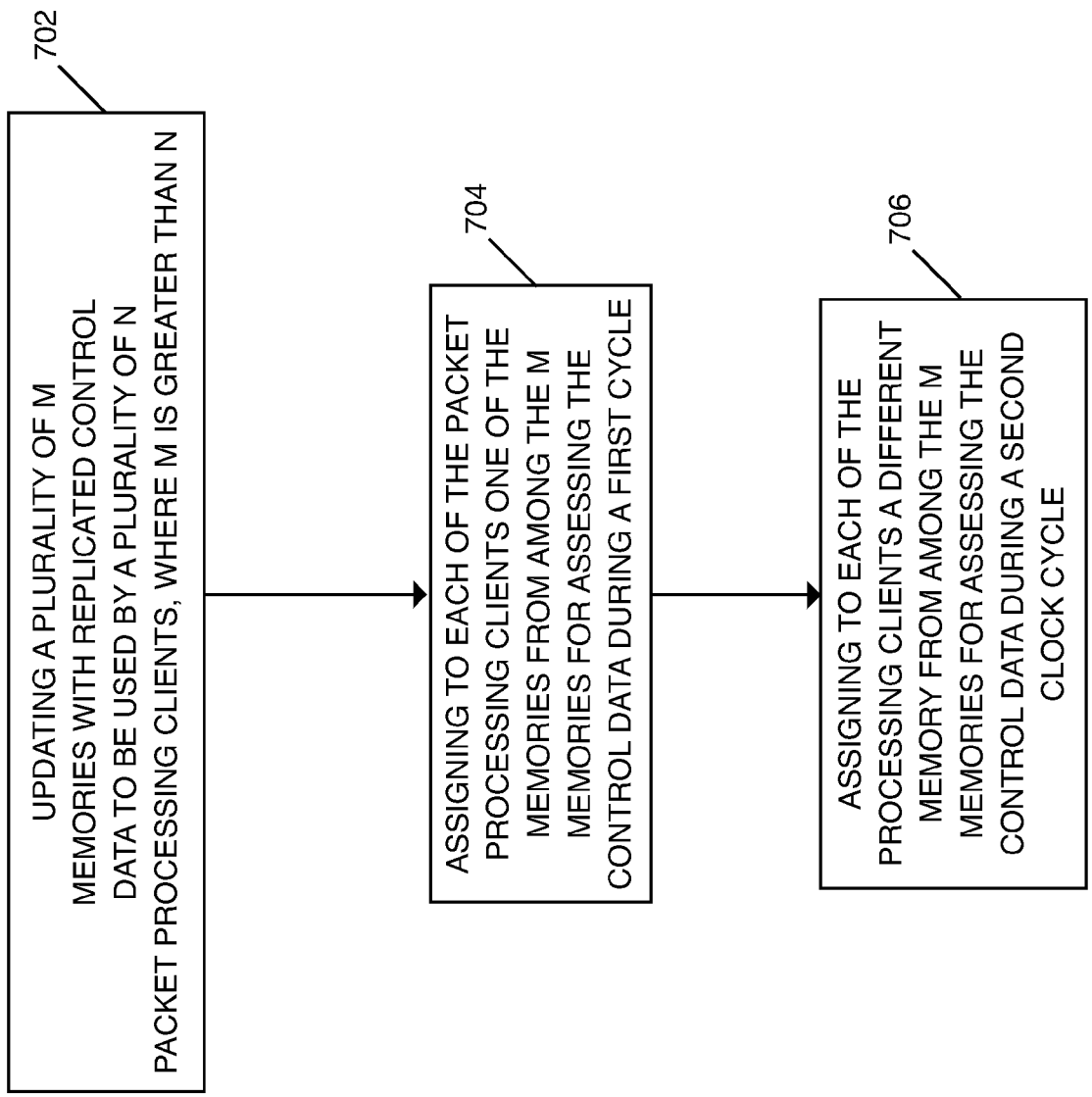
FIG. 7 is a flow diagram depicting a method of providing control data to a plurality of packet processing clients configured to process packet data received by a network.

FIG. 7 is a flow diagram depicting a method of providing control data to a plurality of packet processing clients configured to process packet data received by a network. At 702, a plurality of M memories are updated with replicated control data to be used by a plurality of N packet processing clients, where M is greater than N. At 704, one of the memories from among the M memories are assigned to each of the packet processing clients for accessing the control data during a first clock cycle, each packet processing client being assigned a different one of the memories from among the M memories, wherein at least one of the memories among the M memories is a first unassigned memory that is not assigned to a packet processing client during the first clock cycle. At 706, a different memory from among the M memories is assigned to each of the processing clients for accessing the control data during a second clock cycle, wherein at least one of the memories among the M memories is a second unassigned memory that is not assigned to a packet processing client during the second clock cycle, the second unassigned memory being different from the first unassigned memory.

This application uses examples to illustrate the invention. The patentable scope of the invention includes other examples. For example, in embodiments of the disclosure, the processing clients of FIG. 1 are components of a network switch, a router, or other network device.

What is claimed is:

1. A network device that receives packet data from a network, comprising:
   a plurality of packet processing clients for processing packet data received from a network;
   a plurality of memories, wherein a quantity of the memories is greater than a quantity of the packet processing clients, each of the memories storing a replica of same control data to be used by the packet processing clients, the packet processing clients being configured to selectively read the control data from any of the memories; and an arbiter coupled to the packet processing clients and to the memories, the arbiter being configured to select in a first clock cycle for the plurality of packet processing clients a first subset of memories from among the plurality of memories from which to read the control data, and in a second clock cycle, subsequent to the first clock cycle, to select for the plurality of packet processing clients a second subset of memories from among the plurality of memories from which to read the control data, the second subset of memories including at least some memories that are not included in the first subset of memories.

2. The network device of claim 1, wherein the second subset of memories does not include at least one memory that is in the first subset of memories.

3. The network device of claim 1, wherein the arbiter comprises a first shift register containing an entry for each of the packet processing clients that is configured to identify an order according to which the packet processing clients are assigned memories for access during a particular clock cycle, and wherein the arbiter is configured to determine a starting memory from which to map memories for assignment to the packet processing clients in the order identified by the first shift register.

4. The network device of claim 3, wherein the arbiter is configured to determine the starting memory using a modulo operation that is based on a number of packet processing clients in the plurality of packet processing clients and a number of memories in the plurality of memories.

5. The network device of claim 4, wherein the arbiter is configured to determine the starting memory according to:

Starting Memory=(cycle*$N$)% $M$, where cycle is a clock cycle number, N is the number of packet processing clients, % represents a modulo operation, and M is the number of memories.

6. The network device of claim 3, wherein the shift register is configured to shift the packet processing clients X positions per clock cycle.

7. The network device of claim 1, wherein during the first clock cycle where a first memory is assigned to a first packet processing client, when the first packet processing client has a read request and the first memory is not busy with a prior read request or otherwise unable to execute the read request, the first processing client is configured to read data from the first memory.

8. The network device of claim 1, wherein the device is one of a bridge, a router, a switch or other network device.

9. The network device of claim 1, wherein the packet processing clients are disposed on an electrical circuit substrate, and wherein the memories are external to the electrical circuit substrate.

10. The network device of claim 9, wherein the memories are implemented using a technology that does not permit read operations in consecutive clock cycles to a same memory location or region.

11. A method of providing control data to a plurality of packet processing clients configured to process packet data received by a network, comprising:

updating a plurality of M memories with same replicated control data to be used by a plurality of N packet processing clients, where M is greater than N;

using an arbiter to assign to each of the packet processing clients one of the memories from among the M memories for accessing the control data during a first clock cycle, each packet processing client being assigned a different one of the memories from among the M memories, wherein at least one of the memories among the M memories is a first unassigned memory that is not assigned to a packet processing client during the first clock cycle;

using the arbiter to assign to each of the processing clients a different memory from among the M memories for accessing the control data during a second clock cycle, wherein at least one of the memories among the M memories is a second unassigned memory that is not assigned to a packet processing client during the second clock cycle, the second unassigned memory being different from the first unassigned memory.

12. The method of claim 11, wherein at least one of the memories among the M memories assigned to a packet processing client in the first clock cycle is not assigned to a packet processing client in the second clock cycle.

13. The method of claim 11, wherein assigning one of the memories to each of the packet processing clients for the first clock cycle comprises:

using a first shift register that contains an entry for each of the packet processing clients to determine a first packet processing client to be assigned a memory.

14. The method of claim 13, wherein assigning one of the memories to each of the packet processing clients for the first clock cycle further comprises:

determining a first memory to be assigned based on a modulo operation that is based on a number of packet processing clients N in the plurality of packet processing clients and a number of memories M in the plurality of memories.

15. The method of claim 14, wherein the first memory is determined according to:

Starting Memory=(cycle*$N$)% $M$, where cycle is a clock cycle number, N is the number of packet processing clients, % represents a modulo operation, and M is the number of memories.

16. The method of claim 14, wherein assigning one of the memories to each of the packet processing clients for the second clock cycle comprises:

shifting the entries in the shift register X positions; and using the shifted entries in the first shift register to determine a first packet processing client to be assigned a memory.

17. The method of claim 11, wherein during the first clock cycle where a first memory is assigned to a first packet processing client, when the first packet processing client has a read request and the first memory is not busy with a prior read request or otherwise unable to execute the read request, the first processing client reads data from the first memory.

18. The method of claim 11, further comprising:

disposing the packet processing clients on an electrical circuit substrate;

providing memories that are external to the electrical circuit substrate, and coupling the external memories 3 the packet processing clients that are disposed on the electrical circuit substrate.

19. The method of claim 18, wherein providing the memories comprises providing memories that are implemented using a technology that does not permit read operations in consecutive clock cycles to a same memory location or region.

20. A network switch device, comprising:

a first electrical circuit substrate comprising:

a plurality of packet processing clients for processing packet data received from a network;

a plurality of memories, wherein a quantity of the memories is greater than a quantity of the packet processing clients, each of the memories storing a replica of same control data to be used by the packet processing clients, the packet processing clients being configured to selectively read the control data from any of the memories; and an arbiter disposed on the first electrical substrate coupled to the packet processing clients and to the memories, the arbiter being configured to select in a first clock cycle for the plurality of packet processing clients a first subset of memories from among the plurality of memories from which to read the control data, and in a second clock cycle, subsequent to the first clock cycle, to select for the plurality of packet processing clients a second subset of memories from among the plurality of memories from which to read the control data, the second subset of memories including at least some memories that are not included in the first subset of memories.

* * * * *